June 30, 1953 W. M. VENNER ET AL 2,643,742
BRAKE PLATE AND CYLINDER ASSEMBLY
Filed June 21, 1950

INVENTORS:
WILLIAM M. VENNER
PERCY L. BOWSER, JR.
BY
ATTORNEYS.

Patented June 30, 1953

2,643,742

UNITED STATES PATENT OFFICE 2,643,742

BRAKE PLATE AND CYLINDER ASSEMBLY

William M. Venner, Ladue, and Percy L. Bowser, Jr., University City, Mo.

Application June 21, 1950, Serial No. 169,362

5 Claims. (Cl. 188—152)

This invention relates to brake plate and cylinder assemblies, and in particular, to those assemblies having a cast brake plate.

One difficulty with integrally cast fluid brake plate and cylinder assemblies, as heretofore known, particularly those cast of one of the light metals, such as aluminum or magnesium or their alloys, lies in the permeability of the casting, which allows leakage of the brake fluid under pressure.

One of the objects of this invention is to provide cast brake plate and cylinder assemblies in which the cylinder is cast within the brake plate and in which leakage through the casting is eliminated. Other objects will become apparent to those skilled in the art when the following description is read, in connection with the accompanying drawings.

In accordance with this invention, one or more cyliders of non-porous material are cast within a brake plate. All fluid connections with the cylinders are made directly to the cylinders. For example, non-porous nipples, to which fluid conduit, bleeder valves and the like, may be connected, are connected directly to the non-porous cylinders as by a threaded joint, or brazing or the like, so that leakage through any cast metal is precluded. Likewise, fluid conduit between the cylinders is directly connected to the cylinders. These nipples and conduits may also be cast within the brake plate. The expression "cast within the brake plate," is used in the specification and claims to mean that the brake plate is cast around the non-porous element, so that that element is wholly or partly within the cast plate.

Referring now to the drawings.

Figure 1:
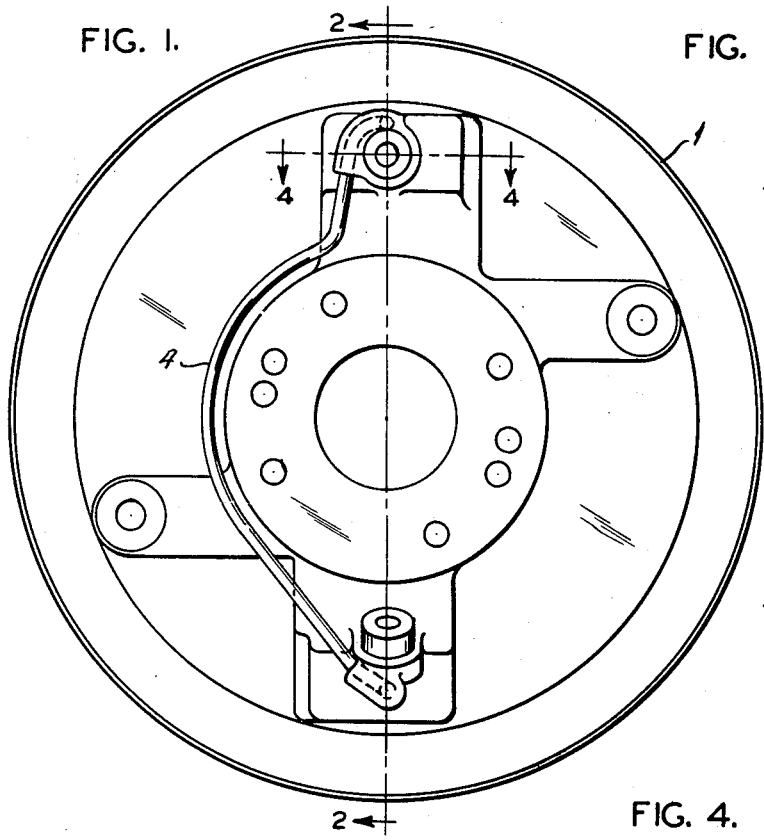
Figure 1 is a plan view showing one side of a brake plate constructed in accordance with an illustrative embodiment of this invention.

Referring now to the illustrative embodiments of the drawing, 1 represents a brake plate cast of some light metal, such as aluminum or magnesium or an alloy of one of them. Cylinders 3 of a non-porous material, which may but need not be a light metal such as rolled sheet aluminum, or aluminum extrusions, are cast within the brake plate 1. Cylinders 3 are open at their forward end 13 and closed at their rearward end 14. The rearward end 14 may be made integral with the remainder of the cylinder 3 and, in any event, is fluid-tight. In the embodiment shown in Figures 1–4, the cylinders 3 are connected by a connecting tube 4, which is brazed at 7 directly to the cylinders 3 toward the rearward end 14 of these cylinders. Non-porous female nipples 5 are similarly secured to the cylinders 3. It can be seen that other methods of permanently joining nipples and conduit to the cylinders may be employed, depending in part upon the materials from which these elements are made.

Figure 5:
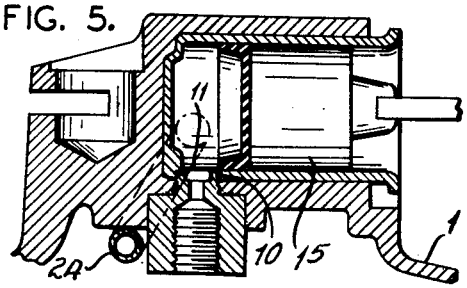
Figure 5 is a sectional view corresponding to the view shown in Figure 4, but showing a different embodiment of this invention.

In the embodiment shown in Figure 5, cylinder 3 is cast within the brake plate 1 but is tapped to take a threaded fitting, which may be of any suitable conventional type, on connecting tube 24. Cylinder 3 is also tapped and threaded at 10 to take threaded nipple 11.

Figure 4:
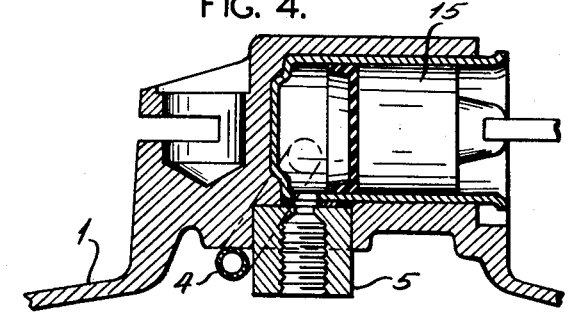
Figure 4 is a sectional view taken along the line 4—4 of Figure 1.

In the embodiments of both Figures 4 and 5, a piston 15 is shown within the cylinder, simply by way of illustration.

Figure 2:
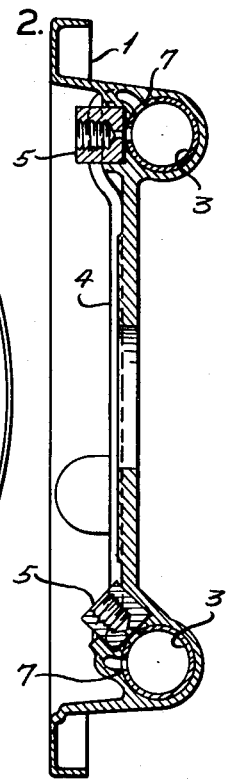
Figure 2 is a sectional view taken along the line 2—2 of Figure 1.
Figure 3:
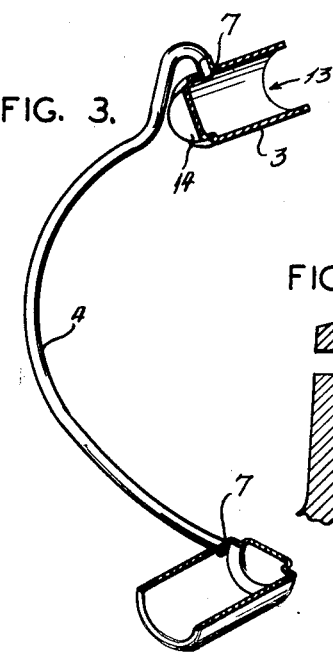
Figure 3 is a detail perspective view, partly cut away, of some of the elements of the embodiment of this invention shown in Figures 1, 2 and 4.

In constructing the device shown in Figures 1, 2 and 4, the connecting tube 4 is brazed to cylinders 3 to form a single unit as shown in Figure 4. Nipples 5 are also brazed to the cylinder 3. The entire unit of cylinders, connecting tube and nipples is set in the brake plate mold and the brake plate is cast around it. It can be seen that the entire unit need not be enclosed within the brake plate, but that, for example, a portion of connecting tube 4 may be exposed as in Figure 1. On the other hand, the unit may, if it be so desired, be cast entirely within the brake plate.

In constructing the device illustrated in Figure 5, a cylinder 3, tapped to take threaded male connections, is set separately in the brake plate mold and the brake plate is cast around it. A threaded nipple 11 and connecting tube 24, with its fittings, may be connected after the brake plate casting is finished. The brake plate immediately adjacent the tapped holes of the cylinder may also be tapped to strengthen the connections. However, the tapped wall of the cylinder is made sufficiently heavy to insure a fluid-tight threaded joint between the cylinder and the male connections. If necessary, a boss may be provided on or in the cylinder.

The operation of a brake plate assembly constructed in this manner is similar to that of a brake plate of the usual integral construction in which the cylinders are simply wells cast or machined in the brake plate casting itself, or in that construction in which the cylinders are simply secured externally of the brake plate. However, as contrasted with the integral type construction, no fluid is lost because of porosity in the operation of the brake plate of this invention, and as contrasted with the "external" cylinder construction, the cylinders are held fast against disalignment or injury within the brake plate structure itself.

While these cylinders are cast within the brake plate, they need not be welded thereto, nor dovetailed or flanged within the brake plate, so that, particularly with the embodiment of this device shown in Figure 5, in which the fluid connections are removable, the cylinder may, if necessary, be removed and replaced. The principal thrust to be withstood by the cylinder in use is in a direction to force the cylinder into the brake plate well.

It will be apparent to those skilled in the art that numerous variations from the illustrative embodiment described, but within the scope of the specification and claims, are possible. For example, the non-porous material from which the cylinders are made may be steel or brass, or any other suitable non-porous material. The connection to the cylinders may be varied, as for example, by omitting the connecting tube or one of the nipples, or by providing releasable but unthreaded fluid-tight connections. The number of cylinders may also be varied to include only one or more than two.

Thus it is seen that a simple, sturdy brake plate and cylinder assembly is provided in which the cylinder is maintained against disalignment and damage within the brake plate and in which the leakage of fluid because of the porosity of the cast plate is eliminated.

Having thus described the invention, what is claimed and desired to be secured by Letters Patent is:

1. In a fluid brake plate and cylinder assembly, the improvement which comprises a cast brake plate with an integral unit, including two cylinders of non-porous material connected by a tube of non-porous material, cast within said brake plate.

2. In a fluid brake plate and cylinder assembly, the improvement which comprises a cast brake plate and cylinders of non-porous material cast within said brake plate, said cylinders being provided with connections for fluid conduit.

3. In a fluid brake plate and cylinder assembly, the improvement which comprises a cast brake plate and an integral unit consisting of two cylinders of non-porous material, connected by a tube of non-porous material and provided with nipples for connection to fluid conduit, said integral unit being cast within said brake plate.

4. A fluid brake plate and cylinder assembly, comprising a cast brake plate, a cylinder of non-porous material cast within said brake plate, and a fluid connection releasably and directly secured to said cylinder.

5. A fluid brake plate and cylinder assembly, comprising a cast brake plate and a cylinder of non-porous metal cast within said brake plate, said cylinder being provided with a connection for fluid conduit.

WILLIAM M. VENNER.
PERCY L. BOWSER, Jr.

References Cited in the file of this patent

UNITED STATES PATENTS

| Number | Name | Date |
| --- | --- | --- |
| 2,227,933 | Hersey | Jan. 7, 1941 |
| 2,247,374 | Hawley | July 1, 1941 |
| 2,308,859 | Burnett | Jan. 19, 1943 |
| 2,331,554 | Irgens | Oct. 12, 1943 |
| 2,372,415 | Eksergian | Mar. 27, 1945 |